United States Patent
Shiozawa et al.

(10) Patent No.: US 7,869,333 B2
(45) Date of Patent: Jan. 11, 2011

(54) OPTICAL DISC APPARATUS AND OPTICAL DISC REPRODUCING METHOD

(75) Inventors: Manabu Shiozawa, Yokohama (JP); Kazutoshi Shigeta, Tokyo (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1040 days.

(21) Appl. No.: 11/493,822

(22) Filed: Jul. 27, 2006

(65) Prior Publication Data
US 2007/0121446 A1 May 31, 2007

(30) Foreign Application Priority Data
Nov. 29, 2005 (JP) .................... 2005-343045

(51) Int. Cl.
*G11B 7/00* (2006.01)
(52) U.S. Cl. .............. 369/116; 369/53.18; 369/53.29; 369/53.3
(58) Field of Classification Search ............. 369/47.5, 369/53.18, 53.29, 53.3, 116
See application file for complete search history.

(56) References Cited

U.S. PATENT DOCUMENTS

| | | | |
|---|---|---|---|
| 5,796,704 A | * | 8/1998 | Nanba et al. ............. 369/53.12 |
| 6,016,297 A | * | 1/2000 | Nagasawa et al. ......... 369/53.28 |
| 7,406,012 B2 | * | 7/2008 | Kamei .................... 369/53.18 |
| 2006/0221787 A1 | * | 10/2006 | Kitagaki et al. ........... 369/47.5 |
| 2009/0154326 A1 | * | 6/2009 | Watanabe et al. ........... 369/116 |

FOREIGN PATENT DOCUMENTS

| | | |
|---|---|---|
| JP | 2003-115109 | 4/2003 |
| JP | 2003-257072 | 9/2003 |
| JP | 2004-220744 | 8/2004 |
| JP | 2004-272962 | 9/2004 |
| JP | 2004-355723 | 12/2004 |

* cited by examiner

*Primary Examiner*—Wayne R Young
*Assistant Examiner*—Brenda Bernardi
(74) *Attorney, Agent, or Firm*—Antonelli, Terry, Stout & Kraus, LLP.

(57) ABSTRACT

The object of this invention is to provide an optical disc apparatus and an optical disc reproducing method that can realize an excellent reproducing operation by suppressing noise in the optical disc apparatus using an optical attenuator. In order to solve this object, a control voltage of the optical attenuator is changed according to reproduction power when reproducing the optical disc and an ambient temperature of the optical attenuator. In addition, the amplitude of a high frequency current for driving a laser diode is changed according to an attenuation factor of the optical attenuator.

4 Claims, 9 Drawing Sheets

FIG.1
(a)
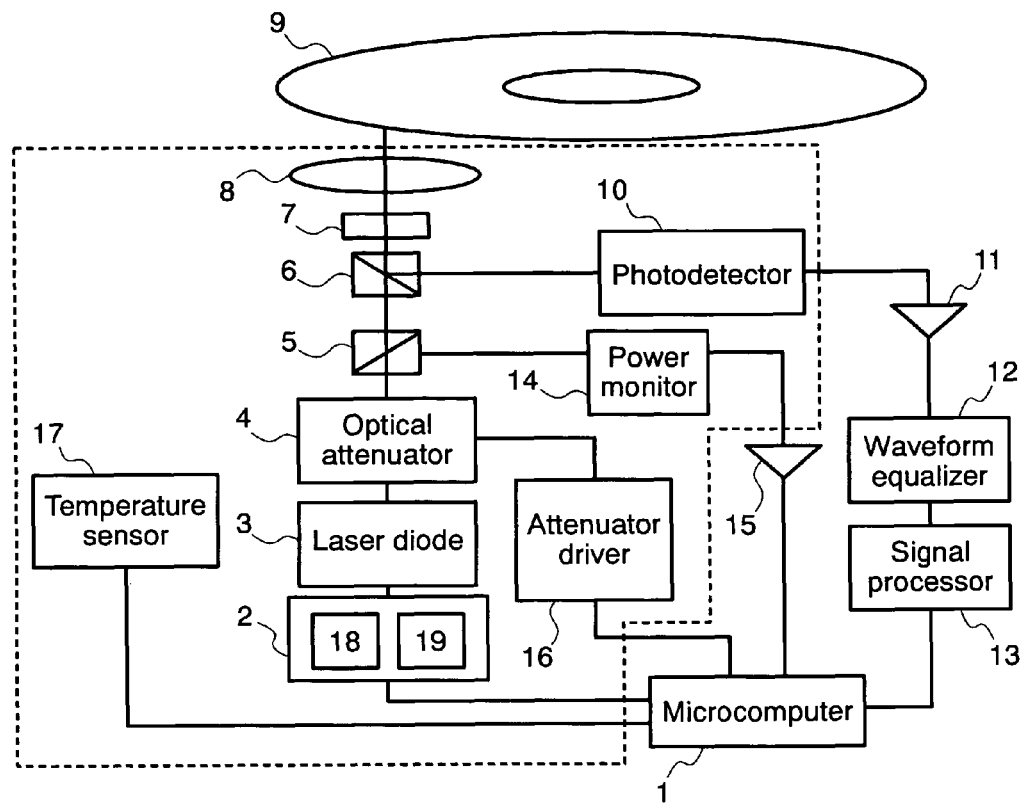
(b)
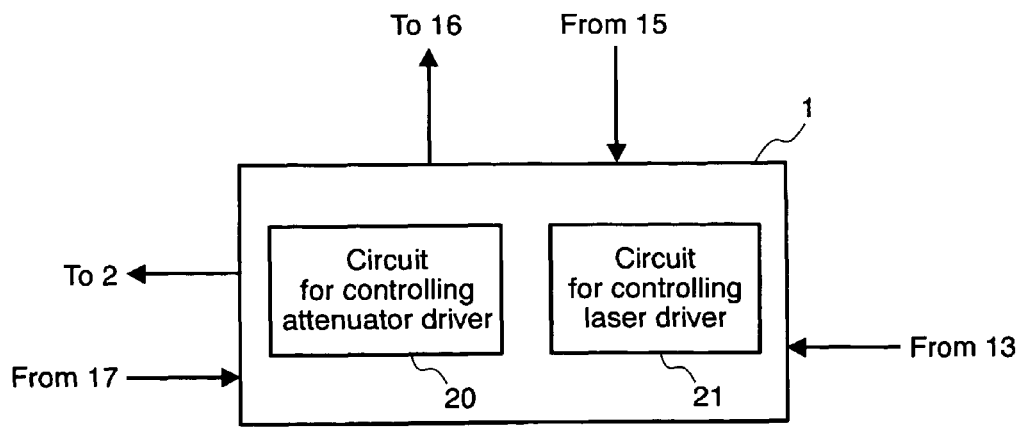

Reproduction power

| Temperature | | ~P1 | P1~P2 | P2~P3 | P3~ |
|---|---|---|---|---|---|
| | ~T1 | V11 | V12 | V13 | V14 |
| | T1~T2 | V21 | V22 | V23 | V24 |
| | T2~T3 | V31 | V32 | V33 | V34 |
| | T3~ | V41 | V42 | V43 | V44 |

OPTICAL DISC APPARATUS AND OPTICAL DISC REPRODUCING METHOD

CLAIM OF PRIORITY

The present application claims priority from Japanese application serial no. JP 2005-343045, filed on Nov. 29, 2005, the content of which is hereby incorporated by reference into this application.

BACKGROUND OF THE INVENTION

1. Field of the Invention

The present invention relates to an optical disc apparatus for recording and reproducing an optical disc by suppressing laser noise of a laser diode.

2. Description of the Related Art

Japanese Patent Laid-open Publication (JP-A) No. 2003-257072 gives description of the optical disc as follows. In recent years, the digital versatile disc (hereinafter referred to as DVD) attracts much attention as a high-density optical disc capable of recording a large amount of digital information. However, as the capacity of information grows larger, realization of a higher density optical disc is sought. Note here that in order to attain higher-density recording than that of the DVD, it is necessary to record a smaller mark on a recording layer than that of the DVD. For this purpose, it is necessary to shorten a wavelength of a light source and enlarge the numeral aperture (hereinafter referred to as NA) of an objective lens. The DVD uses a laser of 660-nm wavelength as a light source and a lens of 6.0 NA as an objective lens. The use of a blue laser, for example, of 405-nm wavelengthas a light source and the objective lens of 0.85 NA makes it possible to attain a recording capacity about 5 times larger than the DVD. In addition to this, along with higher output of a blue laser in recent years, for the purpose of attaining higher recording capacity than the so-called one-layer disc with a single recording layer, a multi layer disc with two or more recording layers is being developed. For example, if a disc with two recording layers is realized, the storage capacity will be about 10 times the DVD. However, in the conventional high-density optical disc apparatus, since various stress margins at the time of reproduction are severer than the DVD, quantum noise of a blue laser acting as a light source poses a problem. This quantum noise can be controlled to be low if the output laser power is increased, which is a characteristic of a laser diode acting as a light source. However, if the output laser power is increased, a power of the laser that is converged and applied onto the recording layer (hereinafter referred to as irradiation power) will increase, causing degradation of the recording layer and erasing of data.

JP-A No. 2004-220744 discloses that a problem of "providing an optical head and an optical recording medium drive apparatus that can attain excellent recording and/or reproducing characteristic by successfully suppressing increase of laser noise in a light source even at a high temperature above the normal temperature" is solved by using a configuration such that "in the case where a laser diode is used as a light source, when a temperature becomes high, increase in the laser noise is suppressed and accordingly the reproduction characteristic is not influenced because higher the temperature, smaller the optical coupling efficiency is made, and consequently emission output of the light source is made larger.

SUMMARY OF THE INVENTION

As described above, as high-density recording is being advanced, the influence of quantum noise generated at the time of emission of a laser diode is becoming a problem, which leads to a proposition of the use of an optical attenuator in order to solve this problem. Here, the quantum noise means noise generated when a laser diode emits light, and an optical attenuator means a device for attenuating optical intensity, which includes, as concrete examples, devices made of a ND (Neutral Density) filter, a liquid crystal element, and a diffraction grating, respectively. The above-mentioned JP-A No. 2003-257072 uses an "optical element capable of varying transmittance of a light beam" as an optical attenuator. In order to avoid the influence of quantum noise, it is conceivable to increase the emission power of a laser diode (laser power just after emission from the laser diode) to makes the S/N (Signal/Noise) ratio high, but if a reproduction operation is done while maintaining high emission power, it will cause degradation of the recording layer and erasing of data. To avoid this problem, first, a laser diode is made to emit light of high emission power with an excellent S/N ratio, and then, an optical attenuator attenuates optical intensity before the laser beam is applied onto the optical disc recording surface. By this method, the laser light can realize the reproduction operation while maintaining an excellent S/N ratio without causing degradation of a recording layer and erasing of data.

Meanwhile, speeds of a recording operation and the reproduction operation are being enhanced these days, and the CAV (Constant Angular Velocity) method is used at the time of a high-speed reproducing operation. In the CAV method, the operation is conducted at a constant angular velocity, and accordingly the linear velocity is slow in the inner side and fast in the outer side. Generally, the faster the linear velocity (reproduction velocity) is, the higher the reproduction power required at the time of reproduction (i.e., laser power on the optical disc recording surface at the time of the reproduction operation) becomes. Accordingly, the reproduction power required at the time of the reproduction operation becomes higher as a position moves from the inner side to the outer side at the time of there production operation of the CAV method. Because of this, when the reproduction operation is performed while keeping the emission power of the laser diode constant, an attenuation factor of an optical attenuator shall be changed according to a radius (reproduction velocity) even while reproducing the same optical disc. Otherwise, it is impossible to attain the reduction effect of quantum noise as well as obtaining a required reproduction power. JP-A No. 20003-257072 does not disclose a technique of changing the attenuation factor of the optical attenuator when performing the reproduction operation of the CAV system.

In view of absence of this technique, this invention has as a first object to provide an optical disc apparatus capable of obtaining a quantum noise reduction effect and the reproduction power according to a radial position (reproduction velocity) even while reproducing the same optical disc.

Moreover, the optical attenuator changes its characteristic according to an ambient temperature. The characteristic varies as shown in FIG. 4: even while driving the optical attenuator at a constant voltage, when the ambient temperature rises, its attenuation factor will rise. In JP-A No. 2004-220744 A, when the ambient temperature rises, emission power of the laser diode is increased in order to obtain desired reproduction power. Therefore, this causes occurrence of problems, such as shortening of a service life of the laser diode and increase in power consumption.

In view of this, this invention has a second object to provide an optical disc device that can attain a quantum noise reduction effect even when the ambient temperature varies, without shortening the life of the laser diode and increasing the power consumption, and an optical disc reproducing method therefor.

Moreover, as a technique for suppressing noise generated by the reflected light of the optical disc, there is a high frequency superimposing method. By using the optical attenuator and the high frequency superimposing method together, the method can reduce noise further than the case where only the optical attenuator is used. However, there is a problem that the use of the optical attenuator will also attenuate the emission power modulated by high frequency and the noise reduction effect by the high frequency superimposing method cannot fully be attained.

In view of this, this invention has as a third object to provide an optical disc apparatus and optical disc reproducing method for attaining a sufficient noise reduction effect by using the optical attenuator and a high frequency superimposing method together.

Although this invention can solve the above-mentioned problem, for example, by the following embodiment, this invention is not restricted to this embodiment.

The above-mentioned first object can be achieved, for example, by one embodiment below, namely, an optical disc apparatus for reproducing information from an optical disc that has a laser diode, a laser driver, an attenuator, an attenuator driver, and a control unit. Specifically, the control unit controls the attenuator driver so that the attenuator driver changes the attenuation factor of the attenuator according to the radial position (reproduction velocity) of the optical disc while reproducing of the optical disc.

Alternatively, the first object can also be solved by optical disc reproducing method for reproducing information from an optical disc by applying laser light emitted from a laser diode of first power on the optical disc after the first power is attenuated to second power by an attenuator. Specifically, the second power is changed according to a radial position (reproduction velocity) of the optical disc while reproducing the optical disc.

The second object can be solved, for example, by one embodiment below, namely, an optical disc apparatus for reproducing information from an optical disc that has a laser diode, a laser diode driver, an attenuator, an attenuator driver, a control unit, and a temperature sensor. Specifically, the control unit controls the attenuator driver so that the attenuator driver changes the attenuation factor of the attenuator according to the ambient temperature.

Moreover, the second object can be solved, for example, by one embodiment below, namely, an optical disc reproducing method for reproducing information from an optical disc by applying laser light emitted from a laser diode of first power after the first power is attenuated to second power by an attenuator. Specifically, the second laser power is changed according to the ambient temperature of the attenuator while reproducing the optical disc.

The third object can be solved, for example, by one embodiment below, namely, an optical disc apparatus for reproducing information from an optical disc that has a laser diode, a laser driver equipped with a high frequency superimposing circuit, an attenuator, an attenuator driver, and a control unit. Specifically, the laser driver is controlled by the control unit controls so as to vary the high-frequency current amplitude according to the attenuation factor of the attenuator.

Moreover, the third object can be solved, for example, by one embodiment below, namely, an optical disc reproducing method of applying laser light emitted from a laser diode after attenuating first power as emitted to second power on a optical disc and reproducing information from the optical disc. Specifically, a drive current on which high frequency current is superimposed is supplied to the laser diode all the while reproducing the optical disc, and the amplitude of the high frequency current is changed according to the attenuation factor of the attenuator.

According to this invention, there can be provided an optical disc apparatus capable of realizing the excellent reproduction operation by suppressing noise and an optical disc reproducing method therefor.

BRIEF DESCRIPTION OF THE DRAWINGS

FIGS. 1A and 1B are is block diagrams of a configuration showing one embodiment of an optical disc apparatus according to this invention;

DETAILED DESCRIPTION OF THE PREFERRED EMBODIMENTS

Figure 2:
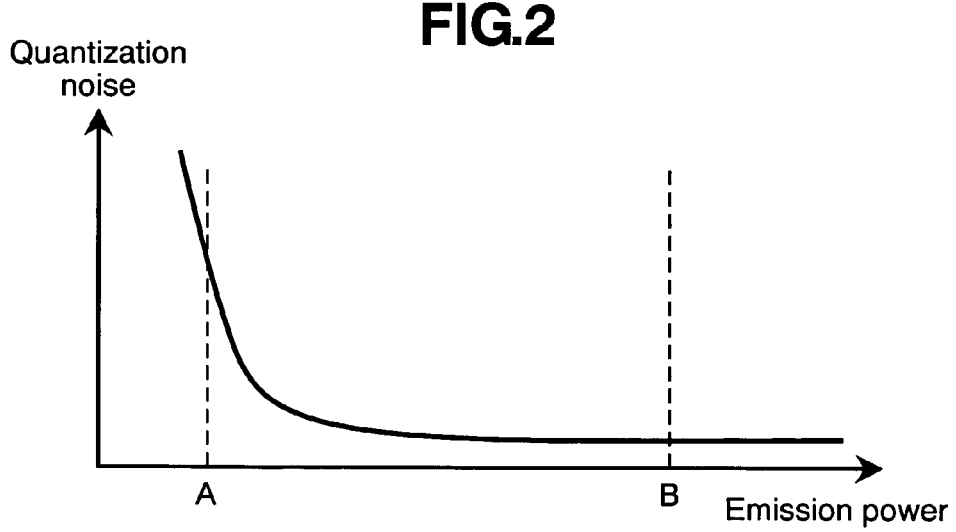
FIG. 2 is a diagram showing a relation between the emission power of a laser diode and the laser noise.

First, principal reference numerals used in the drawings are shown below.

1—microcomputer, 2—laser driver, 3—laser diode, 4—optical attenuator, 5—beam splitter, 6—polarizing beam splitter, 7—quarter-wavelength plate, 8—objective lens, 9—optical disc, 10—photodetector, 11—amplifier, 12—waveform equalizer, and 13—signal processor.

Embodiments of this invention will be described using the drawings below.

First Embodiment

In this embodiment, an example of an optical disc apparatus that alters an attenuation factor of an optical attenuator and a control voltage according to reproduction power will be described.

FIG. 1A is a block diagram of a configuration showing one embodiment of the optical disc apparatus according to this invention. The microcomputer 1 controls the laser driver 2 on recording, reproduction, etc. The microcomputer 1 also controls an attenuator driver 16 on the optical attenuation factor and the control voltage of the optical attenuator 4. The laser driver 2 has a DC (direct current) circuit 18 and a high frequency current circuit 19, and outputs a laser diode drive current on which a high frequency current is superimposed to drive the laser diode 3. The laser diode 3 emits laser light, for example, of a wavelength of 400 nm that has a waveform corresponding to the output of the laser driver 2 including the superimposed high frequency current. The optical attenuator 4 attenuates laser power of the laser light emitted from the laser diode 3 by a predetermined attenuation factor. The attenuation factor of the optical attenuator 4 is controlled based on the control voltage of the attenuator driver 16. A power monitor 14 detects laser power after passing through the optical attenuator 4 through the beam splitter 5, and outputs a current value corresponding to the detected laser power. An amplifier 15 converts the output current value of the power monitor 14 into a voltage value, and outputs it to the microcomputer 1. The laser light passing through the beam splitter 5 changes its polarization by means of the quarter-wavelength plate 7, and is converged on the recording surface of the optical disc 9 by the objective lens 8. Here, laser power of the laser light converged thereon becomes the reproduction power. The photodetector 10 reads a signal recorded on the optical disc 9 through the polarizing beam splitter 6, and outputs it as a current waveform. The amplifier 11 converts the output current waveform of the photodetector 10 into a voltage waveform. The wave form equalizer 12 equalizes the waveform of the amplifier 11. The signal processor 13 performs equalization of the output waveform of the waveform equalizer 11, and decodes and outputs it to the microcomputer 1. A temperature sensor 17 measures a temperature inside the optical pickup and an ambient temperature of the optical attenuator 4, and outputs measurement results to the microcomputer 1. The microcomputer 1 communicates with host devices, such as PC, through an unillustrated interface, such as ATAPI etc. In the example of FIG. 1A, it is assumed that blocks 2-8, 10, 14, 16-19 within a frame shown by a dotted line are mounted on the optical pickup.

FIG. 2 is diagram showing an example relation of the quantum noise versus the emission power of a laser diode. It is known that the quantum noise varies according to the emission power of a laser diode. To be concrete, in a region of low emission power like A, the quantum noise is high, and as the emission power becomes high like B, the quantum noise become slow. Because of this, if the emission power of a laser diode is increased, an S/N ratio can be enhanced excellently.

Figure 3:
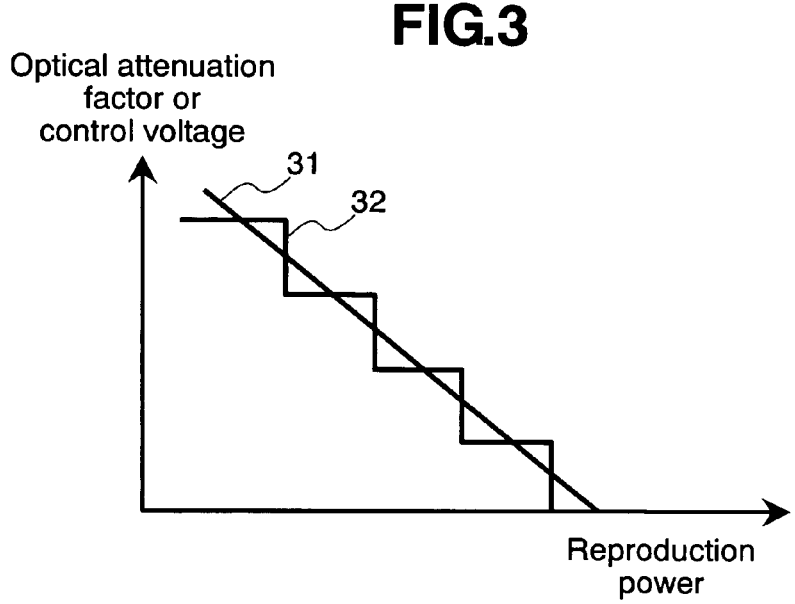
FIG. 3 is a diagram showing one example in which an optical attenuation factor or control voltage is changed according to reproduction power of the optical disc apparatus.

FIG. 3 is a diagram showing an example of a method for controlling the optical attenuation factor or control voltage of an optical attenuator of an optical disc apparatus according to this invention. As shown in FIG. 3, the optical disc apparatus according to this invention alters the optical attenuation factor or control voltage according to the reproduction power. The reproduction power of the optical disc differs between on the inner side and on the outer side when operating in the CAV system. Moreover, the reflectance differs depending on the kind of the optical disc, and accordingly the reproduction power is changed. For this reason, the optical attenuation factor needs to be changed according to a radial position even when the same optical disc is reproduced, and depending on the kind of the optical disc.

A line 31 of FIG. 3 is an example in which the optical attenuation factor or control voltage is changed continuously according to the reproduction power, and a line 32 is an example in which the optical attenuation factor or control voltage is changed stepwise. In the case where a reproduction operation is performed by the CAV system, the optical attenuation factor or control voltage is increased on the inner side and decreased on the outer side. This setting makes it possible to realize an optical disc apparatus that can attain the quantum noise reduction effect and the reproduction power according to a radial position (reproduction velocity) even if the emission power of the laser diode is set constant while performing the reproduction operation on the same optical disc by the CAV system.

Incidentally, a reason why emission power of the laser diode shall be confined in a fixed range is that, if the emission power is decreased, the S/N ratio will deteriorate, and, if the emission power is increased, it will cause shortening of the life and increase in power consumption of the laser diode.

If the reproduction powers are different depending on the kinds of optical discs, what is necessary is to change the optical attenuation factor or control voltage so that desired reproduction power may be achieved after inserting the optical disc and determining its kind. For example, when an optical disc whose reproduction power is low is used to perform recording/reproduction, the optical attenuation factor is adjusted to 50%; when an optical disc whose reproduction power is high is used to do the same, the optical attenuation factor is adjusted to 25%. In addition to this, by subsequently changing the optical attenuation factor or control voltage according to a radial position during the reproduction operation, there can be realized an optical disc apparatus that can attain the quantum noise reduction effect, similarly with the above-mentioned embodiment, and the reproduction power according to the radial position (reproduction velocity).

The control of the optical attenuator according to the reproduction power in this embodiment is conducted by instructions to the attenuator driver 16 from the microcomputer 1. The configuration of the microcomputer 1 may use the conventional one or may be one that uses a circuit 20 for controlling the attenuator driver provided in the microcomputer 1, as shown in FIG. 1B. FIG. 1B is one example of an enlarged view of the inside of the microcomputer 1 of the FIG. 1A.

Second Embodiment

In this embodiment, an optical disc apparatus that alters the attenuation factor and the control voltage of an optical attenuator according to the ambient temperature of the optical attenuator will be described.

Figure 4:
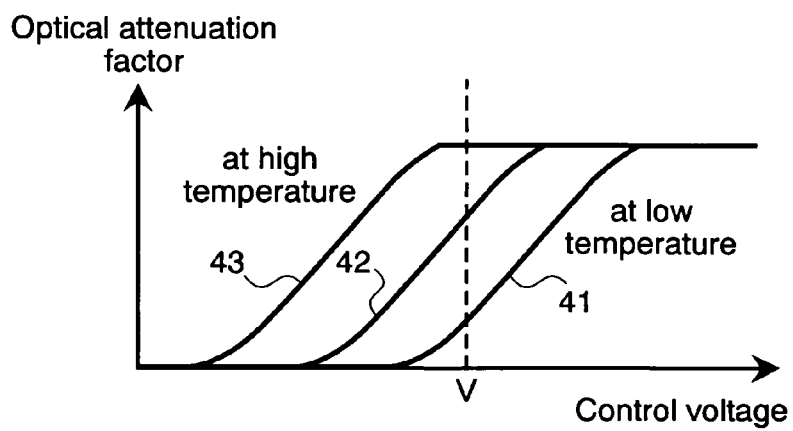
FIG. 4 is a diagram showing one example of a temperature characteristic of the optical attenuation factor in relation to the control voltage of an optical attenuator.

FIG. 4 is a diagram showing an example of a temperature characteristic of the optical attenuation factor in relation to the control voltage of the optical attenuator using a liquid crystal device. As shown in FIG. 4, the attenuator has a characteristic that the optical attenuation factor varies with the ambient temperature even if keeping the control voltage V constant. In the example of FIG. 4, as the temperature rises, the characteristic of the optical attenuator shifts from a curve 41 to a curve 43. As shown in FIG. 1, generally, the control (APC control: Auto Power Control) whereby an emission power is kept constant in the optical disc apparatus is conducted by detecting the laser power after passing through the optical attenuator with the power monitor 14 and feeding it back to the microcomputer 1. Therefore, if the optical attenuation factor becomes large according to the ambient temperature, the laser power after passing through the optical attenuator is attenuated more than needed, and the microcomputer 1 will increase the emission power so that the attenuation may be compensated. As a result, this increase causes shortening of the life and increase in power consumption of the laser diode because of excessive emission power.

Therefore, in an optical disc apparatus according to this invention, the control voltage of the optical attenuator is changed according to the ambient temperature of the optical attenuator, whereby a quantum noise reduction effect can be obtained without shortening the life of the laser diode and increasing the power consumption even when the ambient temperature varies.

Figures 5, 6:
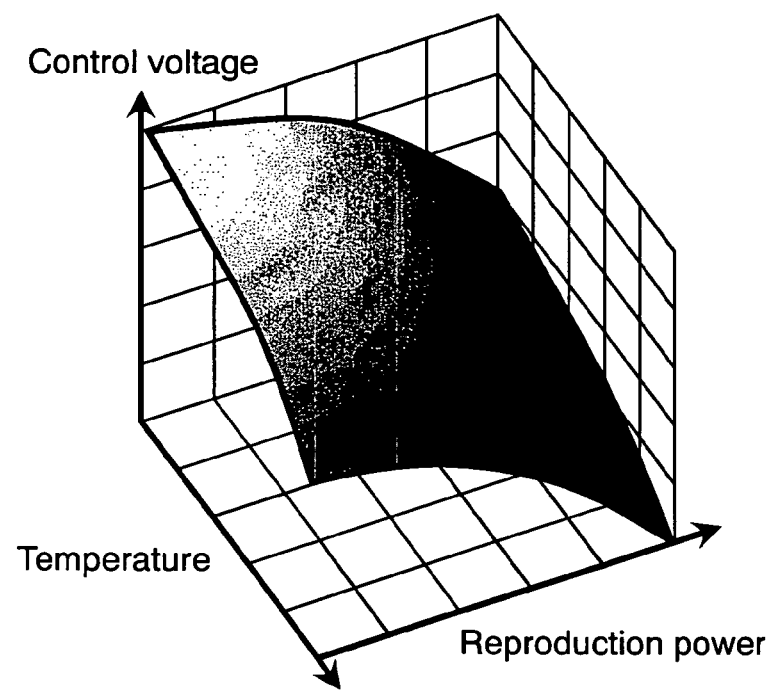
FIG. 5 is a diagram showing one example in which the control voltage is changed according to the reproduction power and an ambient temperature of the optical disc apparatus.
FIG. 6 is a diagram showing one example of a table of the control voltage with respect to there production power and versus the ambient temperature.

FIG. 5 is an example in which a technique of making the control voltage dependent on the temperature and the technique of making the control voltage dependent on there production power described in the first embodiment are combined. This combination can realize an optical disc apparatus that does not shorten the life or increase the power consumption of the laser diode and the like even when the ambient temperature varies and at the same time attains the quantum noise reduction effect and the reproduction according to a radial position (reproduction velocity).

Although FIG. 5 showed the example in which the control voltage was continuously changed according to the reproduction power and the ambient temperature, a table of the control voltage according to the reproduction power and the temperature, as shown in FIG. 6, may be set up in a memory not shown in FIG. 1 or the like. This is because the control of the optical disc apparatus becomes easier to do. Although FIG. 6 shows the example in which the temperature and the reproduction power were divided into four stages and the control voltage was changed stepwise, the number of division may be changed depending on the characteristic of the optical attenuator. This is because the control of the optical disc apparatus becomes easier to do.

The control of the optical attenuator in this embodiment is also conducted by a command to the attenuator driver 16 from a microcomputer 1, as in the first embodiment. The configuration of the microcomputer 1 may use the conventional one or may be one that uses the circuit 20 for controlling the attenuator driver provided in the microcomputer 1, as shown in FIG. 1B.

Third Embodiment

In this embodiment, an example of an optical disc apparatus that uses an optical attenuator and the high frequency superimposing method together is described.

Figure 7:
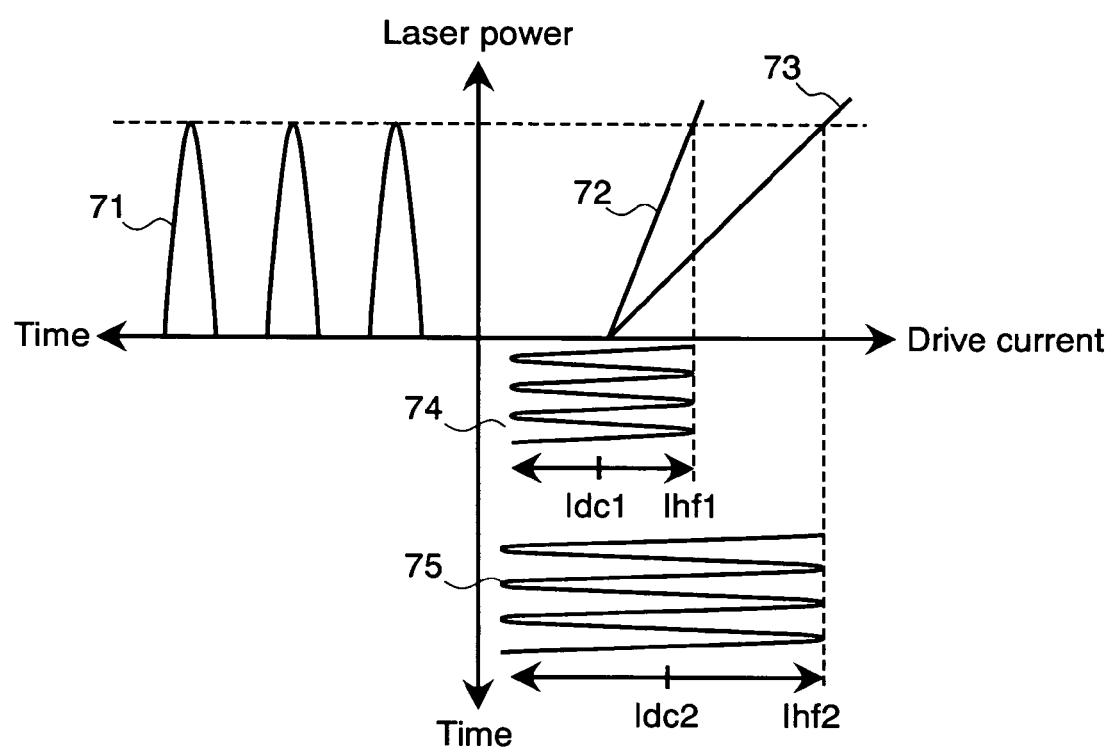
FIG. 7 is a diagram showing a relation between the drive current to the emission waveform of a laser diode.

FIG. 7 is a diagram showing an example of a laser-diode driving method of an optical disc apparatus according to this invention. Here, an emission waveform suitable for suppressing noise generated by reflected light is assumed as a laser emission waveform 71. A reference numeral 72 shows a characteristic of the drive current of the laser diode and the laser power after passing through the optical attenuator in the case of an attenuation factor of the optical attenuator of 0%. A reference numeral 73 shows a characteristic of the drive current of the laser diode and the laser power after passing through the optical attenuator in the case of an attenuation factor of the optical attenuator of 50%. In the case of the characteristic curve 72, what is necessary is just to make the laser diode emit light using a drive current waveform 25 (DC (direct current) current value Idc1, high-frequency current amplitude Ihf1). On the other hand, in the case where the characteristic changes to the characteristic curve 73, the laser diode can be oscillated to emit the same emission waveform 71 as with the characteristic curve 72 by changing the drive current waveform to a waveform 75 (DC current value Idc2, high-frequency current amplitude Ihf2).

Next, a method for changing a drive current waveform will be explained. The optical disc apparatus according to this invention is controlled to emit light of predetermined reproduction power by the conventional automatic power control system (APC). To do this, the laser power is monitored by a power monitor 14 of FIG. 1, and fed back to the microcomputer 1, which controls the laser driver 2. This control determines a DC current value Idc. The high-frequency current amplitude is changed according to the attenuation factor of the optical attenuator. This is because, when the attenuation factor of the optical attenuator is changed, for example, from 0% to 50%, the emission power to the drive current also changes from the characteristic curve 72 to the characteristic curve 73. What is necessary to oscillate the laser diode to emit the emission waveform 71 in the characteristic curve 73 is to change the high-frequency current amplitude Ihf in proportion to the optical attenuation factor. That is, in the above-mentioned example, a formula of Ihf2=2×Ihf1 shall be satisfied.

Although this embodiment shows an example of varying the drive current sinusoidally, the drive current may be modified to be rectangular, triangular, etc. This is because the control of the optical disc apparatus becomes easier to do.

Thus, making the use of the optical attenuator and the high frequency superimposing method together can also realize an optical disc apparatus capable of attaining a sufficient noise reduction effect.

Control of the laser diode in this embodiment is conducted by commands to a laser driver 2 from the microcomputer 1. The configuration of the microcomputer 1 may be one that uses the conventional configuration or one that uses a circuit 21 for controlling the laser driver provided in the microcomputer 1, as shown in FIG. 1B.

Fourth Embodiment

In this embodiment, an example of an optical disc reproducing method in which the attenuation factor of the optical attenuator and the control voltage are changed according to the reproduction power, and an example of the optical disc reproducing method in which the optical attenuator and the high frequency superimposing method are used together are described.

Figure 8:
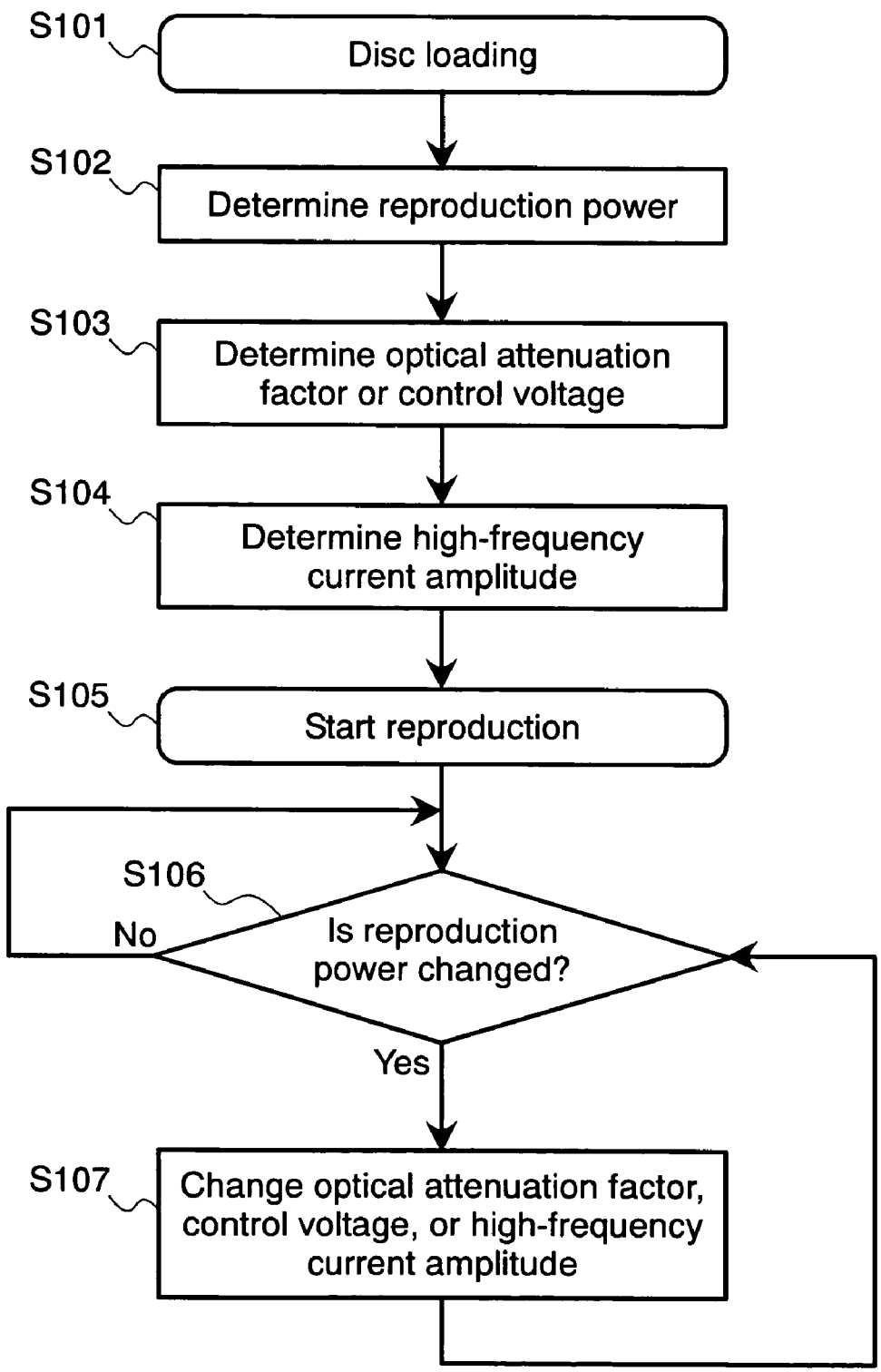
FIG. 8 is a diagram showing an example of a flowchart in which the optical attenuation factor or control voltage is changed according to the reproduction power.

FIG. 8 is an example of a flowchart of the optical disc apparatus when changing the optical attenuation factor or control voltage of the optical attenuator according to the reproduction power. This figure shows a flow from optical disc insertion to completion of reproduction. After the optical disc was inserted in Step S101, the reproduction power is determined in Step S102. Incidentally, the reproduction power may be determined by reading disc information recorded on the optical disc, or may be determined using information that was determined beforehand depending on the kind of the optical disc and is saved in a memory, etc. inside the optical disc apparatus. According to the determined reproduction power, the optical attenuation factor or control voltage of the optical attenuator is determined in Step S103.

According to the determined optical attenuation factor or control voltage, a high-frequency current amplitude is determined in Step S104, and reproduction is started in Step S105. After this, it is checked whether the reproduction power is changed in Step S106 at an appropriate timing. When the reproduction power is changed, the optical attenuation factor or control voltage is changed in Step S107. When there production power is not changed, checking of change in reproduction power in Step S106 is continued.

The above-mentioned appropriate timing includes: every constant period; when the recording/reproduction velocity is changed; in the case where an optical disc having two or more layers of recording films is recorded/reproduced, a layer that is different from a layer on which recording/reproduction was done starts to be used for recording/reproduction; when a recording operation is switched to the reproduction operation; when the reproduction operation is switched to the recording operation, etc.

Thus, there can be realized an optical disc reproducing method of attaining a sufficient noise reduction effect even by using the optical attenuator and the high frequency superimposing method together.

When the modulation degree of high frequency super imposition is not adjusted, the step of S104 and change of the high-frequency current amplitude in Step S107 can be omitted. This is because the omitting is effective when selecting control easiness of the optical disc apparatus other than selecting a reduction effect of the noise caused by the reflected light. When neither the optical attenuation factor nor the control voltage according to the reproduction power is adjusted, the steps of S106 and S107 can be omitted.

Fifth Embodiment

In this embodiment, an example of an optical disc reproducing method in which the attenuation factor of the optical attenuator and the control voltage are changed according to the ambient temperature of an optical attenuator will be described.

Figure 9:
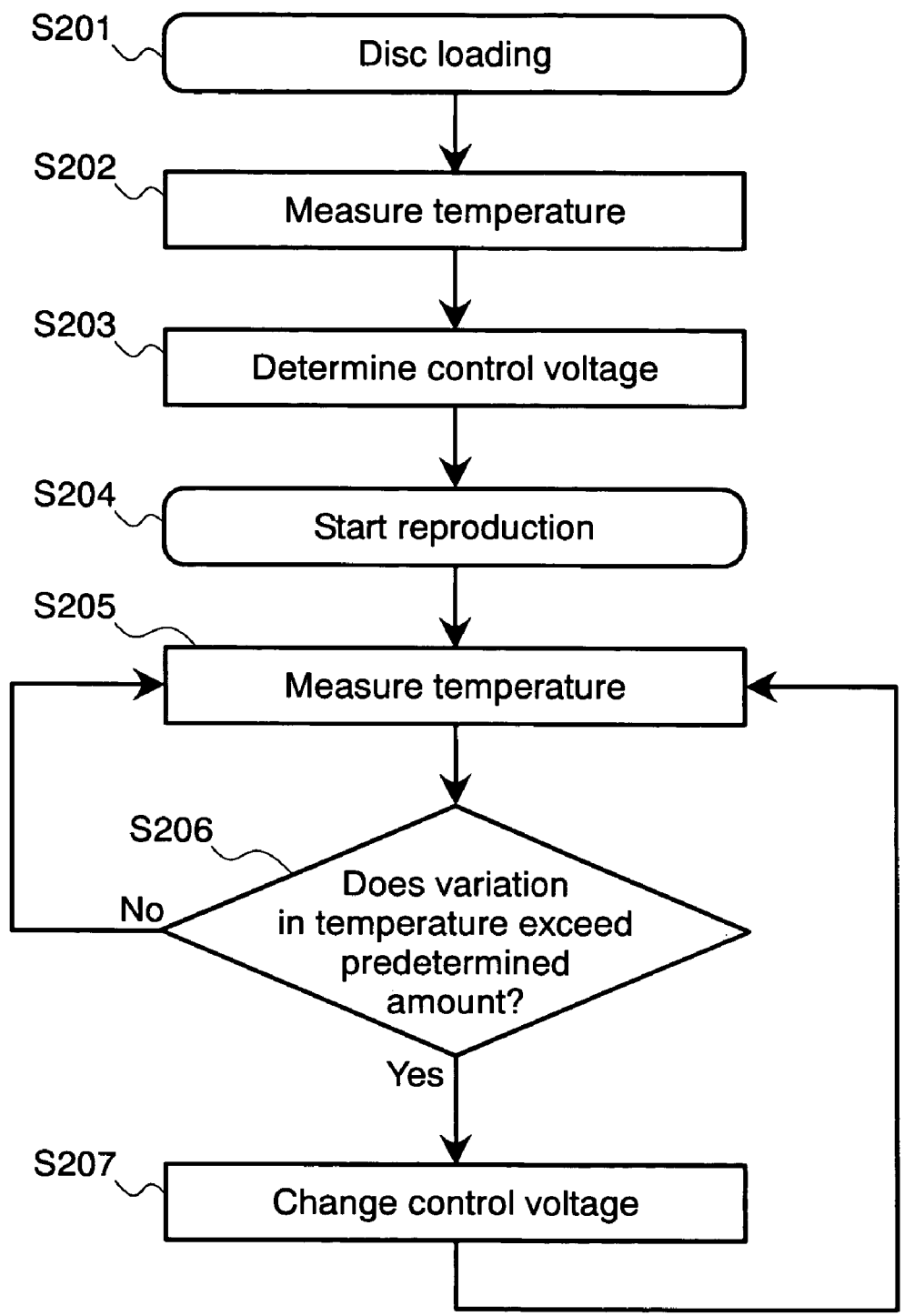
FIG. 9 is a diagram showing an example of a flowchart in which the control voltage is changed according to the ambient temperature of the optical attenuator.

FIG. 9 is an example of a flowchart in the case where the optical disc apparatus alters the control voltage of the optical attenuator according to the ambient temperature. This diagram shows a flow from the optical disc insertion to the completion of reproduction. After the optical disc is inserted in Step S201, the ambient temperature of the optical attenuator is measured in Step S202. According to the measured ambient temperature, the control voltage of the optical attenuator is determined in Step S203, and the reproduction is started in Step S204. After this, the ambient temperature measurement in Step S205 is done at an appropriate timing. It is determined whether the ambient temperature is equal to or more than a predetermined amount in Step S206. When the ambient temperature is equal to or more than a predetermined amount, the control voltage is changed according to the temperature in Step S207. When the ambient temperature is less than the predetermined amount, the temperature measurement in Step S204 is continued at an appropriate timing.

The above-mentioned appropriate timing includes: every constant period; when the recording/reproduction velocity is changed; in the case where an optical disc having two or more layers of recording films is recorded/reproduced, a layer that is different from a layer on which recording/reproduction was done starts to be used for recording/reproduction; when the recording operation is switched to the reproduction operation; when the reproduction operation is switched to the recording operation, etc.

Figure 10:
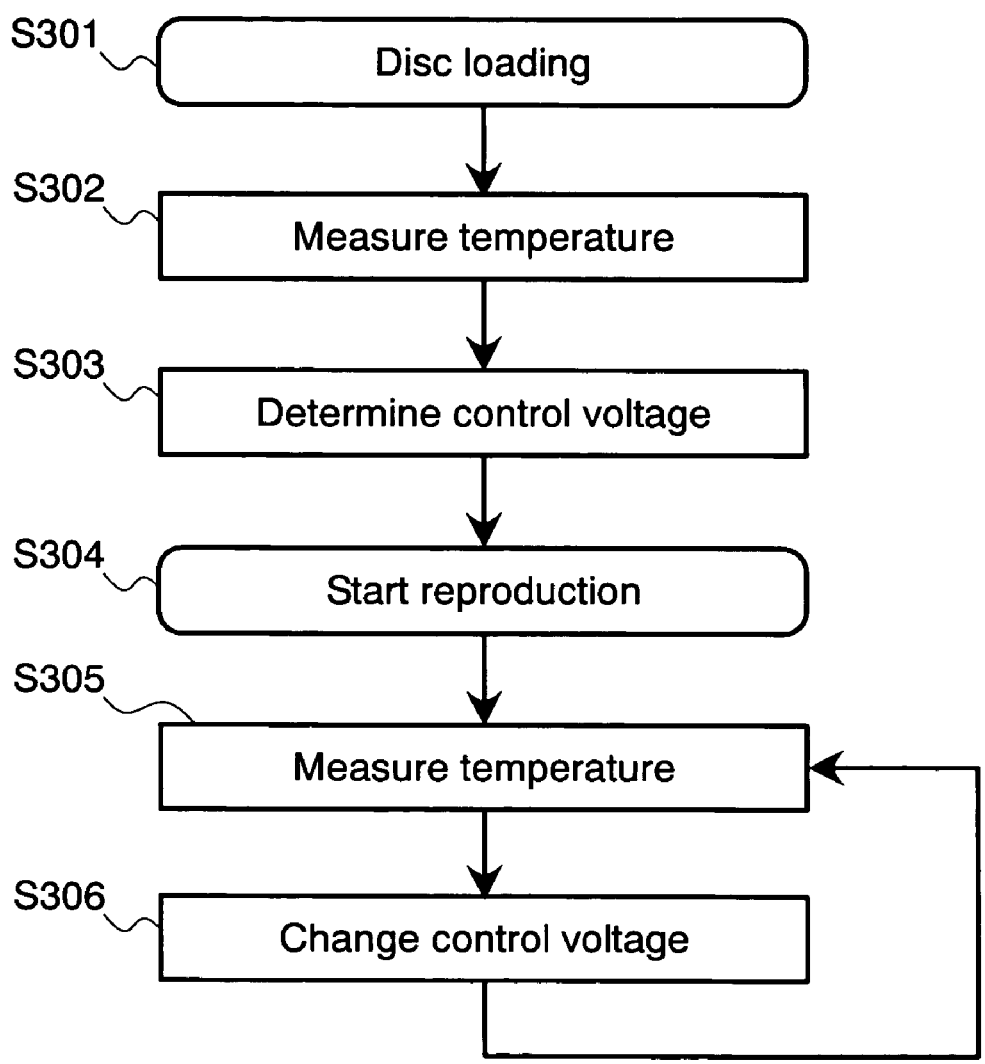
FIG. 10 is a diagram showing an example of a flowchart in which the control voltage of the optical attenuator is changed according to the ambient temperature in real time.

Although, in the above, the example of changing the control voltage stepwise to temperature change was shown, it is possible to feed back the control voltage in real time according to the temperature, as shown in FIG. 10. After the optical disc is inserted in Step S301, the ambient temperature of the optical attenuator is measured in Step S302, the control voltage is determined according to the measured ambient temperature in Step S303, and the reproduction is started in Step S304. After this, the temperature is measured continuously in Step S305 and the control voltage is changed in real time in Step S306.

As mentioned above, by chancing the control voltage of the optical attenuator according to the ambient temperature of the optical attenuator, there can be realized an optical disc reproducing method of attaining a quantum-noise reduction effect without shortening of the life of the laser diode or increasing of the power consumption, etc. even when the ambient temperature varies.

Sixth Embodiment

In this embodiment, an example of an optical disc reproducing method in which the attenuation factor and the control voltage of the optical attenuator are changed according to the reproduction power and the ambient temperature of the optical attenuator and an optical disc reproducing method in which the optical attenuator and the high frequency superimposing method are used together will be described.

Figure 11:
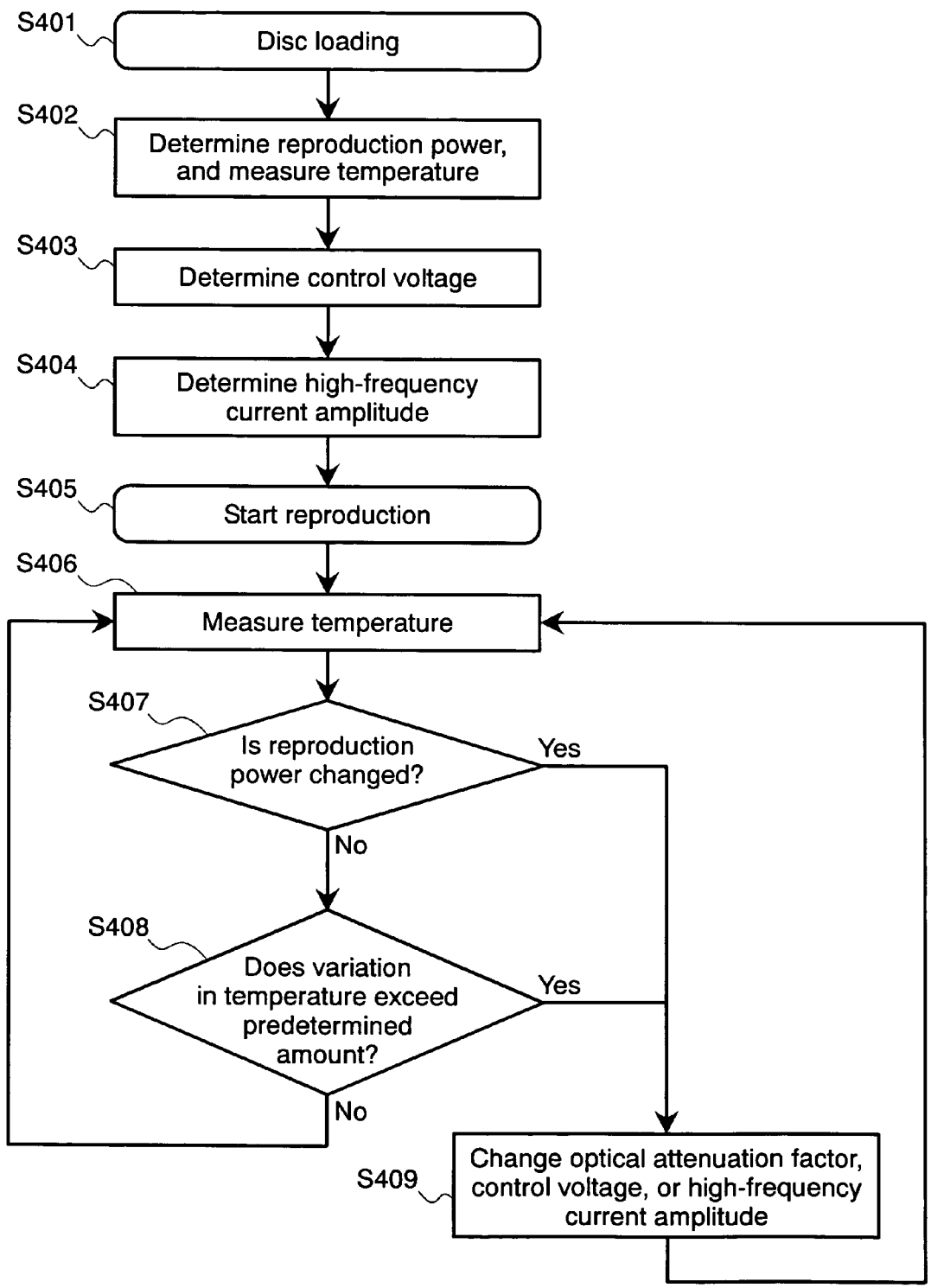
FIG. 11 is a diagram showing an example of a flowchart in which the control voltage of the optical attenuator is changed according to the reproduction power and the ambient temperature of the optical attenuator.

FIG. 11 is an example of a flowchart of an optical disc apparatus that alters the control voltage of the optical attenuator according to both the reproduction power and the ambient temperature of the optical attenuator from insertion of an optical disc to completion of reproduction. After the optical disc is inserted in Step S401, the reproduction power is determined in Step S402 and the temperature is measured. Incidentally, there production power may be determined by reading disc information recorded on the optical disc, or may be determined using information that was determined beforehand according to the kind of the optical disc and saved in a memory, etc. inside the optical disc apparatus. According to the reproduction power and the temperature thus determined, the control voltage of the optical attenuator is determined in Step S403. According to the optical attenuation factor that corresponds to the determined control voltage, a high-frequency current amplitude is determined in Step S404, and the reproduction is started in Step S405. After this, the temperature is measured in Step S406 and the reproduction power is checked in Step S407 at an appropriate timing. When the reproduction power is changed, the control voltage is changed according to the reproduction power in Step S409. When the reproduction power is not changed, it is determined in Step S408 whether the ambient temperature is equal to or more than a predetermined amount. If the reproduction power is changed and the ambient temperature is equal to or more than the predetermined amount, the control voltage is changed according to the reproduction power and the ambient temperature in Step S409. If the ambient temperature is less than the predetermined amount, the temperature measurement in Step S406 is continued at an appropriate timing.

The above-mentioned appropriate timing includes: every constant period; when the recording/reproduction velocity is changed; in the case where an optical disc having two or more layers of recording films is recorded/reproduced, a layer that is different from a layer on which recording/reproduction was done starts to be used for recording/reproduction; when the recording operation is switched to the reproduction operation; when the reproduction operation is switched to the recording operation, etc.

Thus, there can be realized an optical disc reproducing method of attaining a sufficient noise reduction effect even when using together the optical attenuator controllable according to the reproduction power and the temperature change and the high frequency superimposing method.

In addition, when the modulation degree of high frequency superimposition is not adjusted, the step of S404 and change of the high-frequency current amplitude in Step S409 can be omitted. This is because this omission is effective when selecting control easiness of the optical disc apparatus other than selecting a reduction effect of noise caused by the reflected light.

Figure 12:
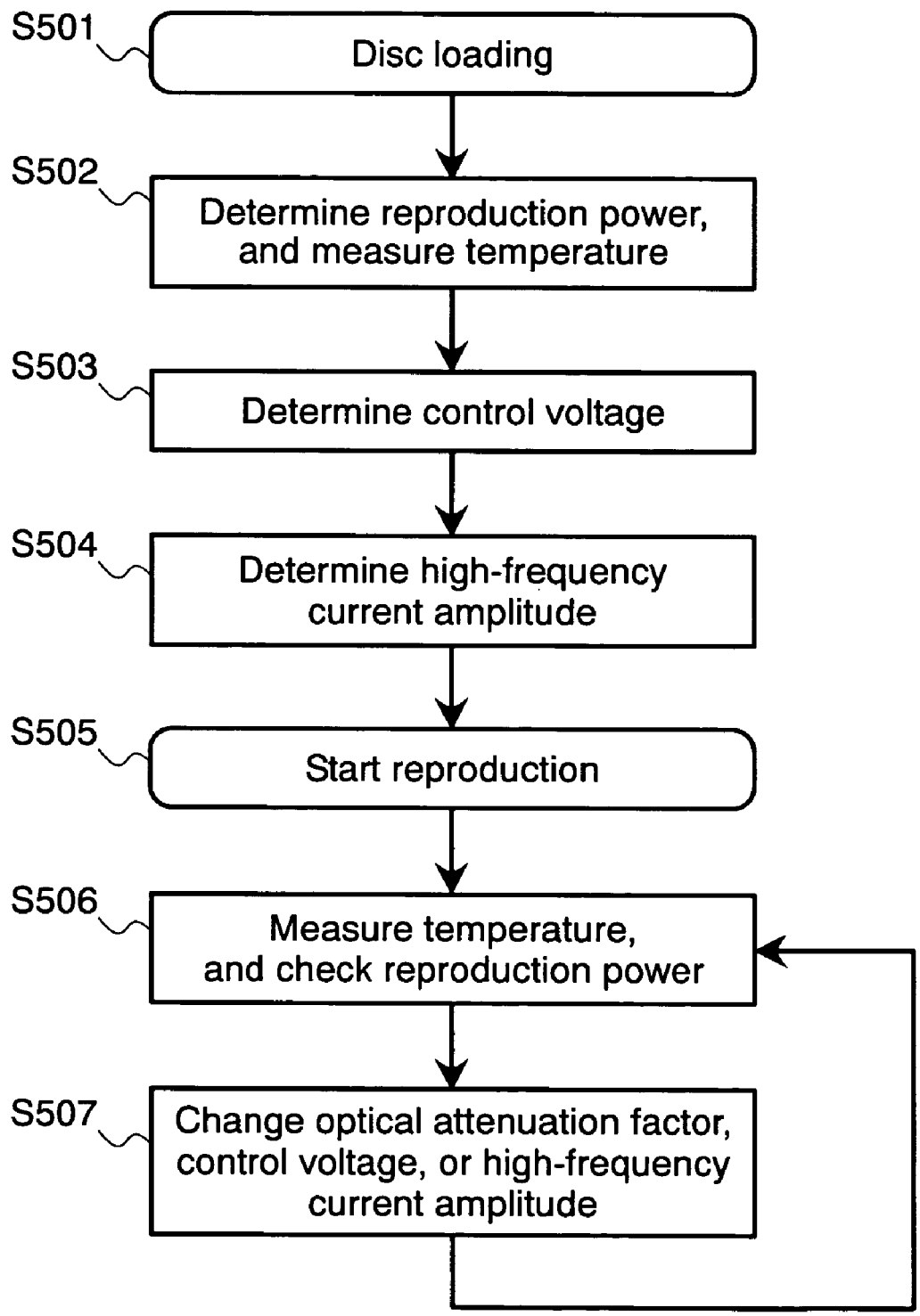
FIG. 12 is a diagram showing an example of a flowchart in which the control voltage of the optical attenuator is changed in real time according to the reproduction power and the ambient temperature of the optical attenuator.

Moreover, although the example of changing the control voltage stepwise according to the temperature change was shown in the above, it is also possible to feed back the control voltage in real time according to the temperature, as shown in FIG. 12. This is done as follows. After an optical disc was inserted in Step S501, the reproduction power is determined and the ambient temperature of an optical attenuator is measured in Step S502. In Step S503, the control voltage is determined according to the determined reproduction power and the measured ambient temperature. According to the optical attenuation factor corresponding to the determined control voltage, the high-frequency current amplitude is determined in Step S504, and the reproduction is started in Step S505. After this, the temperature is measured and the reproduction power is checked continuously in Step S506, and the control voltage is changed in real time in Step S507.

In addition, when a modulation degree of the high frequency superimposition is not adjusted, the step of S504 and the change of the high-frequency current amplitude in Step S507 can be omitted. This is because this omitting is effective when selecting control easiness of the optical disc apparatus other than selecting the reduction effect of the noise caused by the reflected light.

What is claimed is:

1. An optical disc apparatus for reproducing information from an optical disc utilizing laser light, comprising:
   a laser diode for emitting laser light;
   a laser driver for driving the laser diode equipped with a high frequency superimposing circuit for supplying a high frequency current to the laser diode;
   an attenuator for attenuating emission power of the emitted laser light from the laser diode so that attenuated laser light from the attenuator is applied to the optical disc;
   an attenuator driver for driving the attenuator; and
   a control unit for controlling the laser driver and the attenuator driver, wherein the control unit controls the attenuator driver so that the attenuator driver changes the amplitude of the high frequency current according to an attenuation factor of the attenuator while maintaining an average intensity of a reproducing power constant.

2. An optical disc reproducing method for reproducing information from an optical disc by applying attenuated laser light on the optical disc, comprising the steps of:
   emitting laser light of a first power from a laser diode attenuated; and
   attenuating the emitted laser light of the first power from the laser diode to a second power by an attenuator and applying the attenuated laser light of the second power from the attenuator to the optical disc;
   wherein the second power is changed according to the radial position of the optical disc while reproducing the optical disc; and
   wherein a drive current on which a high frequency current is superimposed is supplied to the laser diode while reproducing the optical disc and the amplitude of the high frequency current is changed according to an attenuation factor of the attenuator while maintaining an average intensity of a reproducing power constant.

3. The optical disc reproducing method according to claim 2,
   wherein the second power is changed according to an ambient temperature of the attenuator while reproducing the optical disc.

4. The optical disc apparatus according to claim 1, wherein the control unit further controls the attenuator driver so that the attenuator driver changes an attenuation factor of the attenuator according to an ambient temperature.

* * * * *